(No Model.) 2 Sheets—Sheet 2.
O. L. ANDERSON.
MIDDLINGS PURIFIER.
No. 351,562. Patented Oct. 26, 1886.
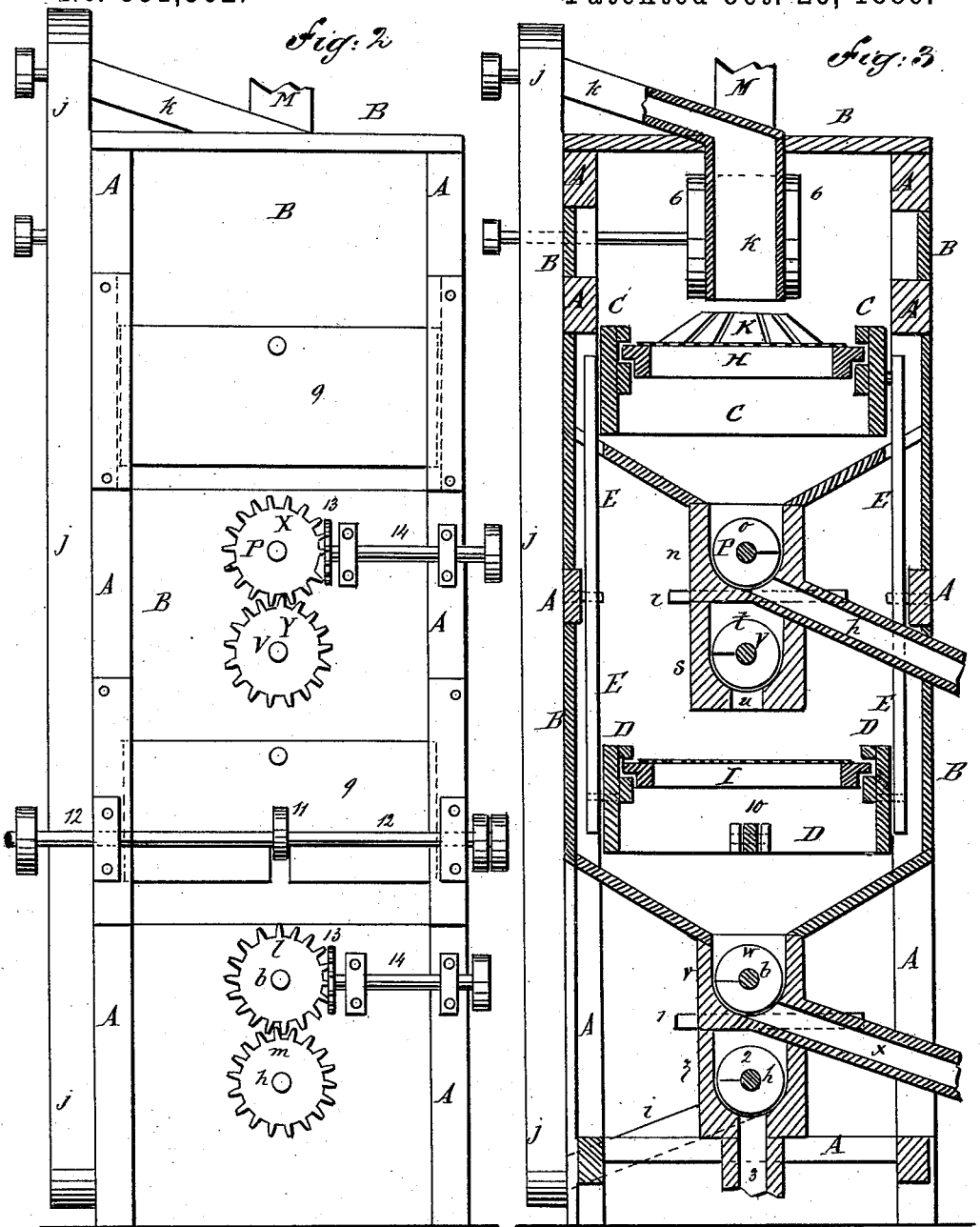
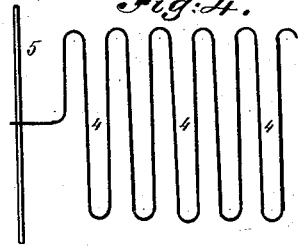
WITNESSES:
Chas. Nida
C. Sedgwick
INVENTOR:
O. L. Anderson
BY Munn & Co
ATTORNEYS.

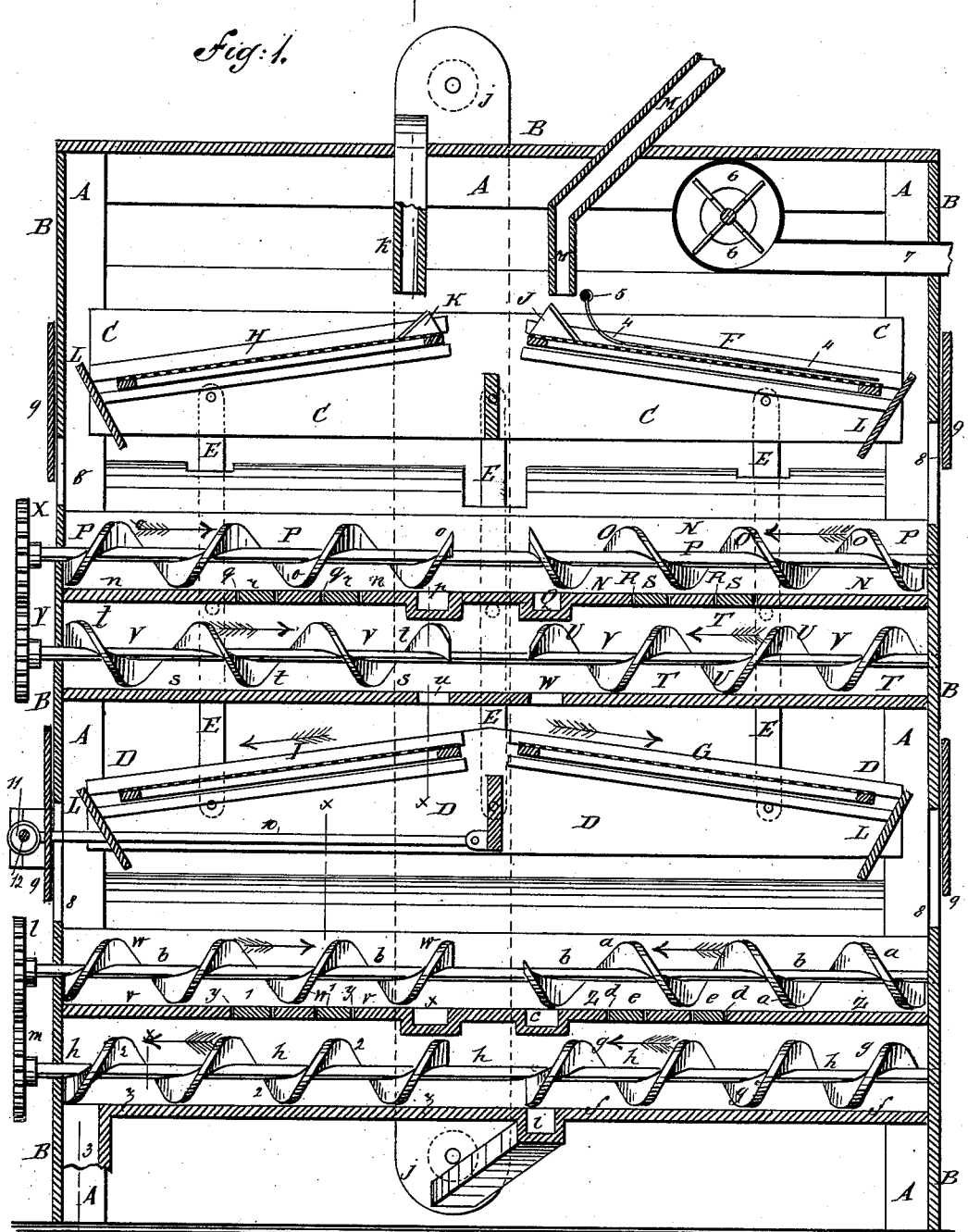

UNITED STATES PATENT OFFICE.

ORA L. ANDERSON, OF PLEASANTVILLE, INDIANA.

MIDDLINGS-PURIFIER.

SPECIFICATION forming part of Letters Patent No. 351,562, dated October 26, 1886.

Application filed March 9, 1886. Serial No. 194,563. (No model.)

*To all whom it may concern:*

Be it known that I, ORA L. ANDERSON, of Pleasantville, in the county of Sullivan and State of Indiana, have invented a new and useful Improvement in Middlings-Purifiers, of which the following is a full, clear, and exact description.

Reference is to be had to the accompanying drawings, forming a part of this specification, in which similar letters of reference indicate corresponding parts in all the figures.

Figure 1 is a longitudinal vertical section of my improved middlings-purifer. Fig. 2 is an end elevation of the same. Fig. 3 is a transverse vertical section taken through the line x x x x x, Fig. 1. Fig. 4 is a plan view of the sieve-cleaner.

The object of this invention is to provide middlings-purifiers constructed in such a manner as to thoroughly purify and grade the middlings as they pass through the machine, and which shall be simple in construction and convenient in use.

The invention consists in the construction and combination of various parts of the middlings-purifier, as will be hereinafter fully described.

A represents the frame of the middlings-purifier, which is inclosed by a casing, B, in the ordinary manner.

In the upper and lower parts of the frame A are placed two frames, C D, which are pivoted, respectively, to the upper and lower ends of two or more pairs of upright bars, E. The bars E are pivoted at their middle parts to the frame A, so that the two frames will vibrate together, but in opposite directions.

To the end parts of the frames C D are attached the sieves F G H I, which incline downward from their inner ends toward their outer ends, as shown in Fig. 1. To the inner ends of the upper sieves, F H, are attached inclined feed-boards J K, provided with flaring grooves, as shown in Fig. 3, to distribute the material as it passes to the said sieves. The sieves have each a tail-board, L, at their lower ends, as shown. Below the sieve F is placed a trough, N, having openings R, slides S, and chute Q, and below the sieve H is placed the trough n, having the openings q, slides r, and chute p. The trough T is placed below the trough N, and has an opening, W, and the trough s, below trough n, has an opening, u. The shafts P extend through the troughs N n, and the shaft V extends through the troughs T s. The shaft P has spirally-arranged conveyer-blades O o, feeding toward the center, where the chutes Q p are located, and the shaft V has the two similar conveyer-blades, U t. The sieve G is below trough T, and under it is the trough Z, having openings d, slides e, and chute c. The sieve I is under the trough s, and below said sieve is placed the trough v, having openings y, slides 1, and chute x. The shaft b extends through the troughs v Z, and has the conveyer-blades w a, feeding from the ends to the centers of said troughs, respectively. Below the trough Z is a trough, f, having a chute, l, which leads to an elevator, j, having a spout, k, at its upper end, adapted to deliver to the sieve H. The trough z is below the trough v, and has the delivery-chute 3 at its outer end. The shaft h extends through the troughs f z, and is provided with the two spirally-arranged blades g 2, feeding in the same direction to the chutes l 3, respectively.

The material is fed through the feed-spout M to the sieve F, and passes through the several conveyers, sieve G, &c., to the elevator j, thence to the sieve H, and the conveyers, sieve I, &c., below said sieve H, to the delivery-spout 3, as will be readily understood.

The sieves F G H I are kept from becoming clogged by the zigzag wire 4, laid upon the cloth of the said sieves, as shown in connection with the sieve F, the other sieves being shown without the cleaner. The inner end of the cleaner 4 is connected with the frame A or casing B of the machine by a rod, 5, or other suitable means, so that the said cleaner will be held stationary while the sieve is vibrated beneath it and in contact therewith.

The middlings, while passing through the machine, are subjected to an air-current induced by a suction-fan, 6, placed in the upper part of the machine, and the discharge-spout 7 of which projects through the casing B, so that the light impurities will be withdrawn from the middlings and discharged through the said fan. Air to supply the current enters the machine through openings 8 in the casing B, directly beneath the outer ends of the sieves F G H I, the entrance of the air being regulated by dampers 9, by means of which the said openings can be wholly or partly closed.

To the middle cross-bar of the frame D is pivoted the inner end of a pitman, 10, the outer end of which is connected with an eccentric, 11, attached to the shaft 12. The shaft 12 revolves in bearings attached to the frame A, and is driven by a belt and pulley from the driving mechanism of the mill, so that the said sieves will be vibrated by the revolution of the said shaft.

With one of the gear-wheels of each pair of conveyer-shafts meshes a gear-wheel, 13, attached to the inner ends of short shafts 14, which revolve in bearings attached to the frame A. The shaft 12 is connected with the shafts 14, the fan 6, and the elevator $j$ by pulleys and belts, as indicated by the pulleys in Figs. 2 and 3, so that the conveyers, the fan, and the elevator will be driven from the said shaft, the speed being regulated by the size of the said pulleys.

Having thus fully described my invention, I claim as new and desire to secure by Letters Patent—

1. In a middlings-purifier, the combination, with the frame A, the casing B, and the feed-spout M, of the two suspended vibrating frames C D, the four sieves F G H I, carried by the said frames, the four pairs of conveyer-troughs, the two pairs of conveyer-shafts, carrying the four pairs of spiral flanges, the elevator carrying the coarse middlings from the lowest conveyer on one side to the upper sieve on the other side, the suction-fan, and a driving mechanism, substantially as herein shown and described.

2. A middlings-purifier comprising a vertical series of shaker-frames, two vertical series of sieves mounted therein, intermediate conveyer-troughs for each series, a feed-spout for one series, and an elevator leading from the conveyer below this series to the upper sieve of the opposite series, substantially as set forth.

ORA L. ANDERSON.

Witnesses:
WILLIAM H. COMBS,
W. B. LITTELL.